United States Patent
Sorensen

[15] 3,662,892

[45] May 16, 1972

[54] IMMISCIBLE LIQUID SEPARATING APPARATUS

[72] Inventor: Robert M. Sorensen, Bryan, Tex.
[73] Assignee: Ocean Pollution Control, Inc., Dallas, Tex.
[22] Filed: Oct. 21, 1970
[21] Appl. No.: 82,568

[52] U.S. Cl. .................................210/242, 210/DIG. 21
[51] Int. Cl. .........................................................B01d 17/02
[58] Field of Search..............................210/83, 242, DIG. 21

[56] References Cited

UNITED STATES PATENTS 3,219,190  11/1965  Thune...................................210/242
2,876,903  3/1959  Lee..................................210/DIG. 21

Primary Examiner—Samih N. Zaharna
Assistant Examiner—Frederick F. Calvetti
Attorney—Richards, Harris & Hubbard

[57] ABSTRACT

An immiscible liquid separating apparatus having an adjustable weir which admits a predominant portion of the lighter of the two liquids and a minor portion of the heavier of the two liquids into a first chamber. Liquid in the first chamber may communicate with a second chamber over another adjustable weir to permit the lighter of the two liquids to flow over the top of the second weir into the second chamber. The first chamber is provided with an aspirating slot disposed generally transversely across the bottom of the chamber to permit the heavier of the two liquids admitted to the first chamber to be withdrawn therefrom upon movement of the apparatus through the liquid body. The lighter of the two liquids collected in the second chamber may be removed by pump means disposed within the second chamber or through a line connected to the pump means positioned externally of the chamber.

4 Claims, 4 Drawing Figures

PATENTED MAY 16 1972 3,662,892

INVENTOR:
ROBERT M. SORENSEN

Richards, Harris & Hubbard
ATTORNEYS

IMMISCIBLE LIQUID SEPARATING APPARATUS

BACKGROUND OF THE INVENTION

1. Field of the Invention

This invention relates to apparatus for separating immiscible liquids, and more particularly to an apparatus which upon being towed through the immiscible liquids skims a portion of the liquids and processes the skimmed portion to separate the lighter and heavier fractions thereof.

2. Description of Prior Art

Many devices have been designed for separating immiscible liquids, and a larger number of devices have been particularly concerned with the separation of oil from water. Oil, if permitted to remain on the water, will spread causing deleterious effect on sea life and spoiling beach areas which it may contact.

Efforts are usually made to first concentrate the oil film with converging booms, such as illustrated in U. S. Pat. Nos. 61,880 and 1,591,024 or by the use of a net-like trawl, such as illustrated in U. S. Pat. No. 3,523,611. Once the oil has been concentrated, it is skimmed from the water, as by permitting it to pass over a weir into a suitable vessel. As the body of liquid from which the oil is skimmed is usually somewhat turbulent due to the existence of waves and swells, a great deal of water is usually collected with the layer of oil rendering it desirable to separate the collected water from the oil. Various devices have been proposed for separating the oil and water and include devices which pump the collected liquids to a chamber or sump where they may separate under more quiescent conditions. The chamber or sump which may be open at its bottom to the body of water within which the apparatus is suspended, as in U. S. Pat. Nos. 61,880; 3,219,190; and 3,523,611, permits the water, which is the heavier of the two liquids, to flow back into the body of ocean, bay or lake while the oil is pumped from the chamber to a suitable receptacle. All of these prior art devices have, however, generally replied upon the development of a hydrostatic head to force the water from the bottom of the chamber which is not a very positive method of removal.

SUMMARY OF THE INVENTION

The invention may be generally described as an apparatus for separating two immiscible liquids which includes a body having side walls which extend downwardly into the liquids and terminate below the interface of the two liquids. A bottom member connects the side walls beneath the interface of the liquids, and a first weir extends between and is positioned transversely of the side walls. The top of the first weir is adapted to be positioned below the interface of the two liquids so that the predominant portion of the lighter of the two liquids will flow over the first weir. A second weir extends transversely of the side walls and forms with the first weir, the side walls and the bottom member a first chamber. The first chamber has an aspirating slot therein which is positioned below the interface of the two fluids and is so shaped that upon movement of the body relative to the liquids a suction will be created at the slot causing the heavier liquid to be withdrawn from the first chamber through the slot. A back wall is positioned transversely of the side members and forms with the second weir, the bottom member and the side walls a second chamber in which may be collected the lighter of the two liquids which flows over the second weir.

DESCRIPTION OF THE PREFERRED EMBODIMENT

Figure 1:
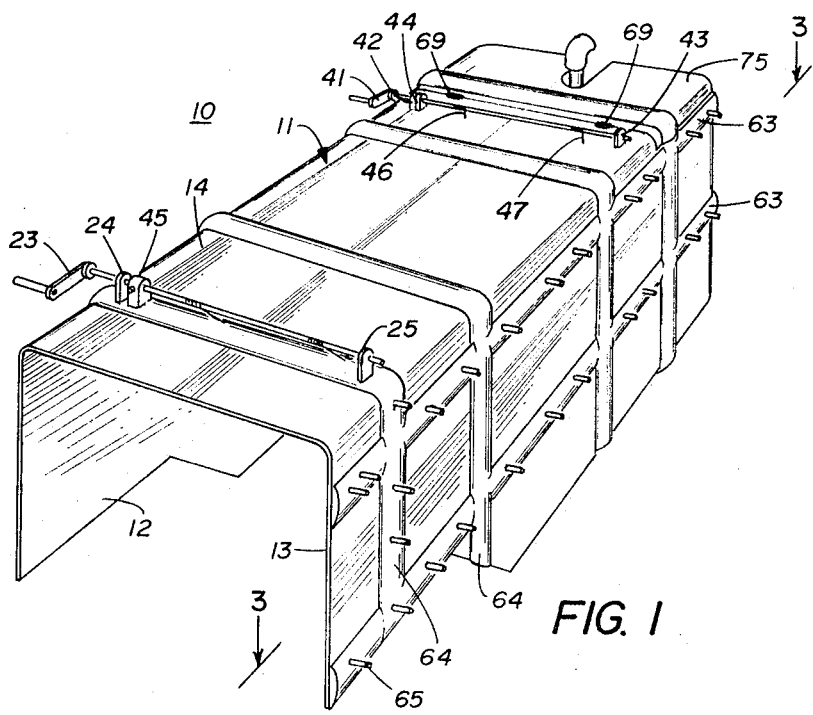
FIG. 1 is a perspective view of one embodiment of the present invention.
Figure 2:
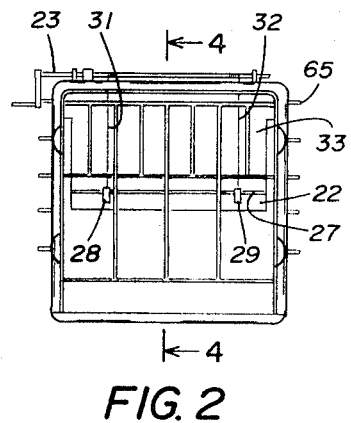
FIG. 2 is a front view of the embodiment illustrated in FIG. 1.
Figure 3:
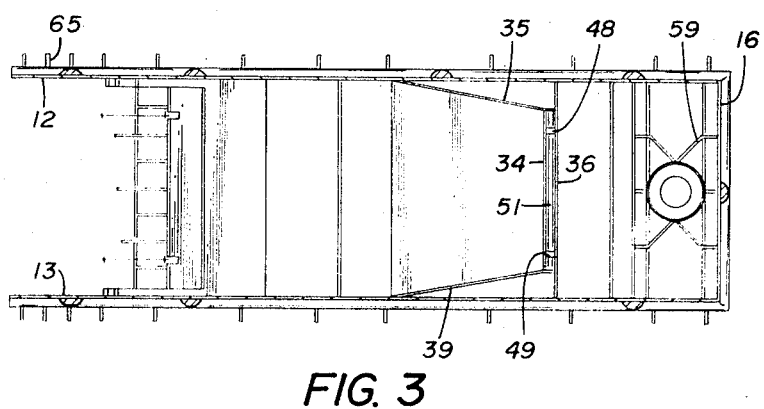
FIG. 3 is a cross-sectional view taken along line 3—3 of FIG. 1.
Figure 4:
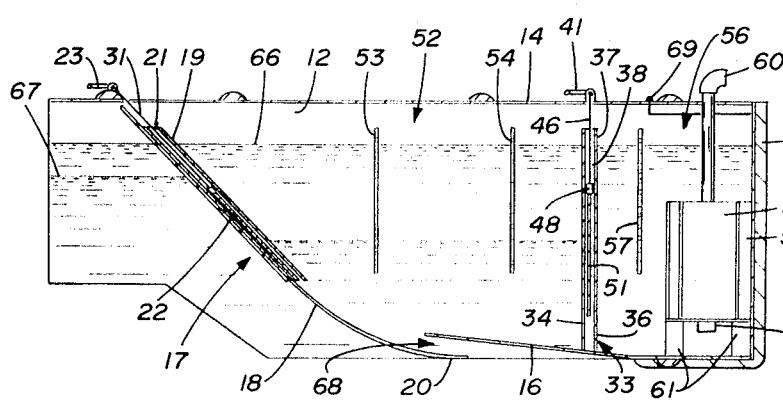
FIG. 4 is a cross-sectional view taken along line 4—4 of FIG. 2.

The apparatus for separating two immiscible liquids, generally indicated by the reference numeral 10, includes a body 11 having side walls 12 and 13, top 14, a rear wall 15 and a bottom member 16. The body 11 may be constructed of any suitable material which is resistant to water and oil, such as fiberglas. Disposed transversely between walls 12 and 13 is a downwardly and rearwardly extending weir 17. Weir 17 comprises a first plate member 18 having an arcuate section which terminates in a substantially horizontal portion 20 near the bottom of walls 12 and 13, as particularly illustrated in FIG. 4. Parallel and proximate to plate 18 is a second plate 19, which together with plate 18 defines a slot 21 within which is slidably carried a gate 22. Gate 22 may be vertically adjusted within slot 21 by rotation of crank 23 which is rotatably supported within vertically extending journal blocks 24 and 25 and a shaft lock collar 26 of conventional design which permits locking of the shaft at desired positions and subsequent release thereof. Blocks 24 and 25 and collar 26 are attached to top 14 by any suitable means. Rotation of crank 23 will effect vertical adjustment of gate 22 as the upper lip 27 of gate 22 is affixed through clamps 28 and 29 to wire members 31 and 32, respectively. Wires 31 and 32 are affixed to crank 23 through top 14 and will be wound thereabout upon rotation of crank 23. As particularly illustrated in FIG. 2, plates 18 and 19 define a U-shaped opening 33 within which the gate 22 may be adjusted. Thus, the amount of liquid admitted to the apparatus 10 may be varied by vertical adjustment of gate 22 which may be used to reduce the size of the opening defined between lip 27 of gate 22 and top 14 of apparatus 10. Mounted on weir 17 across the opening 33 is a large mesh screen 30 which prevents large objects from passing into the apparatus 10.

Rearwardly of weir 17 is another weir 33 comprised of parallel plates 34 and 36. Plate 34 is disposed transversely between converging wings 35 and 39 of walls 12 and 13, respectively, and plate 36 is disposed between walls 12 and 13. Plates 34 and 36 define a slot 37 therebetween which slidably receives a gate 38. Gate 38 may be adjusted within slot 37 by rotation of crank 41 which is rotatably received within journal blocks 42 and 43 and passes through shaft lock collar 44. Blocks 42 and 43 and collar 44 are attached to top 14 and connected to gate 38 through wires 46 and 47. Wires 46 and 47 are attached, through the top 14, to clamps 48 and 49 which are, in turn, attached to the top lip 51 of gate 38. Plates 34 and 36, like plates 18 and 19, define a U-shaped opening within which gate 38 may be elevated and lowered.

Weir 33 defines with weir 17, bottom member 16 and side walls 12 and 13 a first chamber 52. Disposed transversely across chamber 52 between walls 12 and 13 are perforate swash plates 53 and 54. Weir 33 forms with back wall 15 and bottom member 16 and side walls 12 and 13 a second chamber 56. Transversely disposed across chamber 56 is a perforate swash plate 57. Also contained within chamber 56 is a fluid pump, generally indicated by reference numeral 58, supported within a housing 59 which extends between walls 12 and 13. Housing 59 is provided with a plurality of depending legs 61 which support the intake 62 of pump 58 above bottom member 15. Pump 58 discharges liquid passing therethrough through a conduit 60 which passes through top 14. Top 14 has a hinged lid 75 pivotal about hinges 69 to permit access to chamber 56.

To give structural rigidity to the body 11, it is provided with longitudinal bolster members 63 and transverse bolster members 64 of fiberglas or the like. The longitudinal bolster members 63 have a plurality of bolt members 65 extending therefrom to permit attachment of a flotation collar (not shown) or other means for contributing buoyancy to the apparatus 10 when suspended within a liquid.

The most forwardly oriented transverse bolster 64 is also provided with a plurality of bolts 65 to permit attachment to a net-like trawl, such as illustrated in U. S. Pat. No. 3,523,611 or other suitable apparatus for concentrating the oil film which is to be admitted to apparatus 10.

In operation, apparatus 10 is affixed to a suitable oil concentrating apparatus and a flotation collar affixed between bolster 63 so that the surface of the body of liquid within which the apparatus 10 is suspended is in approximately the position indicated by the wavy line 66. The gate 22 is then adjusted by manipulation of crank 23 to position the top lip 27 of gate 22 slightly below the interface between the oil and the water. The surface of the water is generally indicated by the phantom line 67. The apparatus 10 is then towed through the body of liquid causing the oil and some water to be drawn over gate 22 into chamber 52. The water which is admitted to chamber 52 will settle to the bottom of chamber 52. As the horizontal portion 20 of front plate 18 and bottom member 16 define a slot 68 therebetween, the forward motion of apparatus 10, due to the shape of the slot 18 will create an aspirating effect causing the water to be withdrawn from the chamber 52. The oil admitted to chamber 52 will pass over lip 51 of gate 38 into chamber 56 where it will pass under housing 59 and be drawn into the intake 62 of pump 58 and discharged through the exhaust line 60 of pump 58 to a suitable storage vessel located in proximity to the apparatus 10. The position of gate 38 within the slot 37 may be adjusted depending upon the quantity of oil being admitted to chamber 52, its viscosity and variables which the operator may observe and evaluate during operation by observing the quantity of water being discharged from the pump 58. More specifically, if too much water is passing over gate 38, it should be raised. Swash plates 53 and 54 facilitate the separation of oil and water in chamber 52 by minimizing turbulence within the chamber generated by wave action of the liquid within which the apparatus 10 is suspended and swash plate 57, similarly, minimizes turbulence within chamber 56.

While rather specific terms have been used to describe the preferred embodiment of the invention, they should not be used nor are they intended to be limiting upon the invention which is defined by the following claims.

What is claimed is:

1. An apparatus for separating two immiscible liquids, which apparatus comprises:
a body having side walls which extend downwardly into said liquids and terminate below the interface of the two liquids;
a bottom member connecting the side walls beneath the interface of the fluids;
a first adjustable weir extending between and positioned transversely of said side walls, the top of said first weir being adapted to be positioned below the interface of the two liquids so a predominant portion of the lighter of the two liquids will flow over said first weir;
a second adjustable weir extending transversely of the side walls and forming with the first weir, the side walls and the bottom member a first chamber, the first chamber having an aspirating slot therein which is positioned below the interface of the two fluids and is so shaped that upon movement of said body relative to said liquids a suction will be created at the slot causing the heavier liquid to be withdrawn from said first chamber through said slot;
a back wall positioned transversely of said side members and forming with said second weir, said bottom member and said side wall a second chamber in which may be collected the lighter of the two liquids which flows over said second weir;
said first weir extends downwardly and rearwardly toward the back wall of said apparatus and defines at its trailing end a substantially horizontal portion; and
said bottom member has a leading edge which extends over the trailing end of said first weir to define therewith said aspirating slot through which the heavier of the two liquids may be withdrawn upon forward movement of said apparatus.

2. The apparatus of claim 1 including:
a swash plate mounted between said side walls and extending downwardly into said first chamber to minimize turbulence of said liquids in said first chamber.

3. The apparatus of claim 1 wherein:
said side walls have inwardly converging portions between the first and second weir members.

4. The apparatus of claim 1 including:
a wide mesh screen disposed between said wall members forwardly of said first weir to prevent the entry of large objects into said apparatus.

* * * * *